(12) United States Patent
Roberson et al.

(10) Patent No.: US 10,914,159 B2
(45) Date of Patent: Feb. 9, 2021

(54) DOWNHOLE FLUID CHARACTERIZATION METHODS EMPLOYING A CASING WITH A MULTI-ELECTRODE CONFIGURATION

(71) Applicant: HALLIBURTON ENERGY SERVICES, INC., Houston, TX (US)

(72) Inventors: Mark Roberson, Cary, NC (US); Scott Goodwin, Chapel Hill, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 182 days.

(21) Appl. No.: 15/536,090

(22) PCT Filed: Feb. 13, 2015

(86) PCT No.: PCT/US2015/015760
§ 371 (c)(1),
(2) Date: Jun. 14, 2017

(87) PCT Pub. No.: WO2016/130138
PCT Pub. Date: Aug. 18, 2016

(65) Prior Publication Data
US 2017/0342818 A1  Nov. 30, 2017

(51) Int. Cl.
*E21B 47/00* (2012.01)
*G01V 3/26* (2006.01)
(Continued)

(52) U.S. Cl.
CPC .......... *E21B 47/005* (2020.05); *E21B 47/017* (2020.05); *G01V 3/26* (2013.01); *E21B 49/0875* (2020.05)

(58) Field of Classification Search
CPC ...... E21B 47/0005; E21B 47/12; E21B 47/00; G01V 3/26
See application file for complete search history.

(56) References Cited

U.S. PATENT DOCUMENTS 4,468,623 A * 8/1984 Gianzero ............... G01V 3/20
324/355
4,980,642 A * 12/1990 Rodney ................ E21B 47/102
324/325
(Continued)

FOREIGN PATENT DOCUMENTS

WO  2010/029373  2/2010
WO  2013074411  5/2013
(Continued)

OTHER PUBLICATIONS

Ellison, Candice & Mckeown, Murat & Trabelsi, Samir & Boldor, Dorin. (2017). Dielectric Properties of Biomass/Biochar Mixtures at Microwave Frequencies. Energies. 10. 10.3390/en10040502. (Year: 2017).*

(Continued)

*Primary Examiner* — Robert E Fuller
*Assistant Examiner* — Theodore N Yao
(74) *Attorney, Agent, or Firm* — Thomas Rooney; C. Tumey Law Group PLLC (57) ABSTRACT

A method that includes deploying a casing with a multi-electrode configuration over a dielectric layer in a downhole environment. The method also includes collecting electromagnetic (EM) measurements using the multi-electrode configuration, and processing the EM measurements to obtain a characterization of fluids in an annulus between the casing and a borehole wall. A related system includes a casing deployed downhole, the casing having a multi-electrode configuration and a dielectric layer between the casing and the multi-electrode configuration. The system also includes a controller for directing collection of EM measurements using the multi-electrode configuration, and a processor that processes the EM measurements to obtain a (Continued)

characterization of fluids in an annulus between the casing and a borehole wall.

12 Claims, 9 Drawing Sheets

(51) Int. Cl.
    *E21B 49/08*     (2006.01)
    *E21B 17/08*     (2006.01)
    *E21B 47/01*     (2012.01)
    *E21B 47/005*     (2012.01)
    *E21B 47/017*     (2012.01)

(56) References Cited

U.S. PATENT DOCUMENTS

| | | | |
|---|---|---|---|
| 7,586,310 B2* | 9/2009 | Chen | G01V 3/265 |
| | | | 324/347 |
| 2004/0163807 A1* | 8/2004 | Vercaemer | E21B 33/13 |
| | | | 166/250.12 |
| 2004/0245991 A1 | 12/2004 | Hayman et al. | |
| 2005/0205248 A1* | 9/2005 | Barolak | E21B 47/0005 |
| | | | 166/66.5 |
| 2006/0103389 A1* | 5/2006 | Bespalov | E21B 47/0002 |
| | | | 324/338 |
| 2007/0070816 A1* | 3/2007 | Hurst | B06B 1/0633 |
| | | | 367/159 |
| 2009/0188675 A1 | 7/2009 | Bloom et al. | |
| 2009/0243618 A1 | 10/2009 | Wang et al. | |
| 2010/0223988 A1 | 9/2010 | Crow et al. | |
| 2012/0209527 A1* | 8/2012 | Gorek | G01V 3/24 |
| | | | 702/7 |
| 2012/0212326 A1 | 8/2012 | Christiansen et al. | |
| 2013/0074322 A1* | 3/2013 | Maute | E21B 47/102 |
| | | | 29/602.1 |
| 2013/0206387 A1* | 8/2013 | Deville | E21B 47/12 |
| | | | 166/66.4 |
| 2013/0293234 A1* | 11/2013 | Bloemenkamp | G01V 3/24 |
| | | | 324/355 |
| 2014/0174732 A1 | 6/2014 | Goodwin et al. | |
| 2014/0260587 A1* | 9/2014 | Maute | G01F 1/58 |
| | | | 73/152.29 |
| 2014/0367092 A1* | 12/2014 | Roberson | E21B 47/00 |
| | | | 166/250.01 |
| 2014/0372040 A1* | 12/2014 | Wu | G01V 3/28 |
| | | | 702/7 |
| 2015/0025807 A1* | 1/2015 | Anderson | G01V 3/30 |
| | | | 702/11 |
| 2016/0160634 A1* | 6/2016 | Klitzsch | G01M 3/16 |
| | | | 73/152.29 |

FOREIGN PATENT DOCUMENTS

| | | |
|---|---|---|
| WO | 2014/065677 | 5/2014 |
| WO | 2016/126244 | 8/2016 |

OTHER PUBLICATIONS

"Coupling Coefficient" from Schlumberger Glossary. Available from: https://www.glossary.oilfield.slb.com/Terms.aspx?LookIn=term%20name&filter=coupling+coefficient (Year: 2020).*

Canadian Search Report for Application No. 2,973, 439 dated Jun. 21, 2018.

PCT International Search Report and Written Opinion, dated Oct. 21, 2015, Appl No. PCT/US2015/014433, "Fluid Monitoring Using Radio Frequency Identification," filed Feb. 4, 2015.

PCT International Search Report and Written Opinion, dated Oct. 27, 2015, Appl No. PCT/US2015/015760, "Downhole Fluid Characterization Methods and Systems Employing a Casing with a Multi-Electrode Configuration", filed Feb. 13, 2015.

* cited by examiner

DOWNHOLE FLUID CHARACTERIZATION METHODS EMPLOYING A CASING WITH A MULTI-ELECTRODE CONFIGURATION

BACKGROUND

In the hydrocarbon exploration and production industry, accurate information regarding the downhole environment facilitates decisions regarding the placement of wells, drilling operations, well completion operations, and production. A common scenario involves drilling and completing a well to enable long-term production. During the well completion process, a casing or liner (e.g., steel pipe) is installed into a borehole and is cemented in place. During the cementing operations, it is preferable to deploy cement slurry in the annulus between the casing and the borehole wall only after the borehole wall and casing are sufficiently clean (to improve adherence of the cement to the borehole wall and casing). Additionally, cement slurry needs time to cure before drilling can restart to extend the borehole. Collecting information in a downhole environment (e.g., when the borehole wall and casing are clean and/or when a cement slurry has cured) in a manner that is efficient, accurate, and economically feasible is an ongoing challenge.

BRIEF DESCRIPTION OF THE DRAWINGS

Accordingly, there are disclosed in the drawings and the following descriptions downhole fluid characterization methods and systems employing a casing with a multi-electrode configuration.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are downhole fluid characterization methods and systems employing a casing with a multi-electrode configuration. Using the multi-electrode configuration, electromagnetic (EM) signals are emitted and corresponding signals are measured, where variations in the measured EM signals relative to the emitted EM signals are due to the EM properties (e.g., dielectric constant, magnetic permeability, and conductivity) of the downhole fluids or solids that interact with the emitted EM signals. Accordingly, the measured EM signals can be interpreted to identify characteristics of downhole fluids/solids and/or to identify a particular fluid/solid with known characteristics. As an example, the disclosed methods and systems can be used to identify when one or more particular fluids (e.g., oil-based mud, water-based mud, cement slurry, or spacer fluids) are in the annular space near the multi-electrode configuration. The distance to the borehole wall and/or formation EM properties may additionally or alternatively be identified. EM measurements collected using a casing with a multi-electrode configuration as described herein may correspond to different depths of investigation or multiple depths of investigation by varying the frequency of the emitted EM signals and/or by using a plurality of multi-electrode configurations, where each multi-electrode configuration has a different inter-electrode spacing. As desired, EM measurements collected using a casing with one or more multi-electrode configurations as described herein may be collected over time to generate corresponding logs as a function of time.

In at least some embodiments, an example method includes deploying a casing with a multi-electrode configuration over a dielectric layer in a downhole environment. The method also includes collecting EM measurements using the multi-electrode configuration and processing the EM measurements to obtain a characterization of fluids in an annulus between the casing and the borehole wall. Meanwhile, an example characterization system includes a casing deployed downhole, where the casing has a multi-electrode configuration and a dielectric layer between the casing and the multi-electrode configuration. The system also includes a controller for directing collection of EM measurements using the multi-electrode configuration, and a processor that processes the EM measurements to obtain a characterization of fluids in an annulus between the casing and the borehole wall. Various multi-electrode configuration options, mounting options, EM measurement collection options, and EM measurement processing options are described herein.

Figure 1:
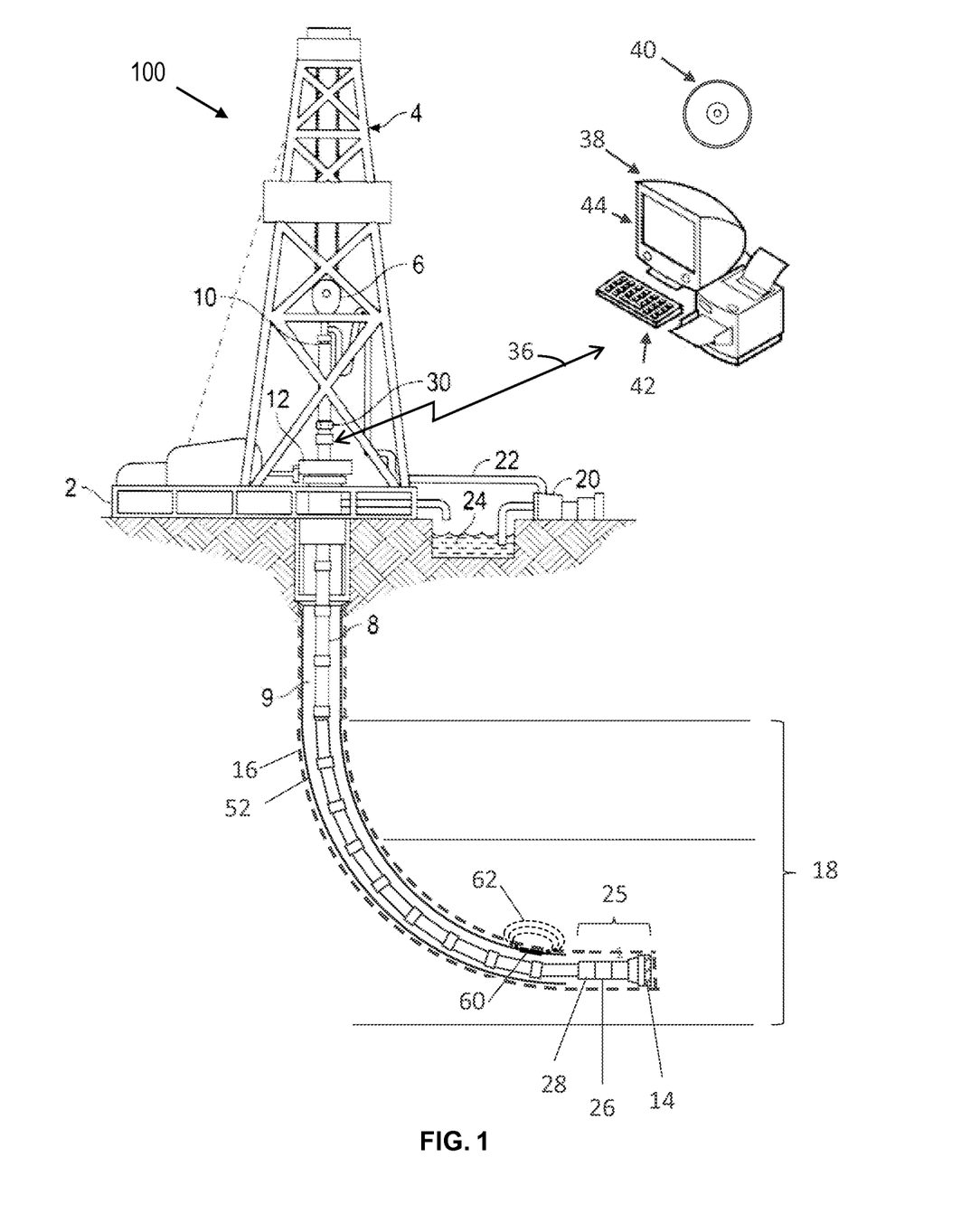
FIG. 1 is a schematic diagram showing an illustrative drilling environment.

The disclosed methods and systems are best understood when described in an illustrative usage context. FIG. 1 is a schematic diagram showing an illustrative drilling environment 100 for forming a borehole 16. In FIG. 1, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. Additionally or alternatively, rotation of the drill bit 14 is controlled using a mud motor or other rotation mechanism (not shown). As the drill bit 14 rotates, it creates the borehole 16 (represented using dashed lines) that passes through various formations 18. A pump 20 circulates drilling fluid through a feed pipe 22 to the kelly 10, downhole through the interior of drill string 8, through orifices in the drill bit 14, back to the surface via an annulus 9 around the drill string 8, and into a retention pit 24. The drilling fluid transports cuttings from the borehole 16 into the retention pit 24 and aids in maintaining the integrity of the borehole 16.

The drill bit 14 is just one component of a bottom-hole assembly 25 that includes one or more drill collars 26 and a logging tool 28. Drill collars 26 are thick-walled steel pipe sections that provide weight and rigidity for the drilling process. The logging tool 28 (which may be built into one of the drill collars) gathers measurements of various drilling or formation parameters. Without limitation, the logging tool 28 may be integrated into the bottom-hole assembly 25 near the drill bit 14 to collect measurements. The collected measurements may be plotted and/or otherwise used for steering the drill string 8, monitoring drilling performance, and/or to analyze formation properties.

Measurements from the logging tool 28 can be acquired by a telemetry sub (e.g., integrated with the logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used. The telemetry signals are supplied via a wired or wireless communications link 36 to a computer 38 or some other form of a data processing device. Computer 38 operates in accordance with software (which may be stored on information storage media 40) and user input via an input device 42 to process and decode the received signals. The resulting data may be further analyzed and processed by computer 38 to generate a display of useful information on a computer monitor 44 or some other form of a display device including a tablet computer. For example, an operator could employ this system to obtain and monitor drilling parameters or formation properties.

In the drilling environment 100 of FIG. 1, installation of a casing 52 is represented as having been performed. Installation of the casing 52 involves joining and lowering modular casing segments until a desired casing section length is reached. Once a desired length and position for a particular casing section is achieved, cementing operations are performed, resulting in a permanent casing section installation. As needed, the borehole 16 is extended by drilling through cured cement at an installed casing section terminus. The process of installing casing sections, cementing the installed casing sections in place, and extending borehole 16 can be repeated as desired.

In FIG. 1, a multi-electrode configuration 60 is represented on an outside surface of the casing 52. This location places the multi-electrode configuration 60 along the annulus 9, where fluids are circulated and/or where cement slurry is pumped as described herein. Accordingly, the multi-electrode configuration 60 can be used to characterize fluids present along the annulus 9. Depending on the depth of investigation and the radial resolution of EM measurements obtained using the multi-electrode configuration 60, multiple layers of fluid can be characterized. Further, the position of the borehole wall relative to the multi-electrode configuration 60 and/or formation characteristics can be monitored using the multi-electrode configuration 60.

To obtain EM measurements, the computer 38 and/or at least one controller (e.g., at earth's surface and/or downhole) directs the multi-electrode configuration 60 to generate EM signals 62 that extend into the annulus 9 and possibly some depth into the surrounding formations 18. The computer 38 and/or at least one controller directs power, telemetry, and/or measurement storage needed to collect EM measurements using one or more multi-electrode configurations as described herein. Further, the computer 38 may store, process, and/or display collected EM measurements, fluid characterizations, multi-layer fluid parameters, logs, and/or related information as described herein. Fluid characterization using multi-electrode configurations is possible because variations in the measured EM signals relative to the emitted EM signals 62 are due to the EM properties (e.g., dielectric constant, magnetic permeability, and conductivity) of downhole fluids in the annulus 9 that interact with the emitted EM signals 62. Accordingly, the measured EM signals can be used to characterize the different types and relative layer thicknesses of fluids present in the annulus 9. Further, the distance between the position of the multi-electrode configuration 60 (and thus the casing 52) and the wall of the borehole 16 can be determined. Further, the attributes of formations 18 within range of the EM signals 62 can be characterized or identified.

Examples of the multi-electrode configuration 60 as in FIG. 1 is described in FIGS. 2A-2H. Each of the multi-electrode configurations represented in FIGS. 2A-2H can be used to emit EM signals and receive corresponding EM signals back after passing through surrounding fluids and nearby formations. A multi-electrode configuration 200 of FIG. 2A includes at least two electrodes 202, where the electrodes 202 are fixably attached to a dielectric material 204 for electrical isolation from surrounding conductive metallic objects. The multi-electrode configuration 200 also includes a ground plane 206, an electrically-isolating protective spacer 208, and a layer of adhesive 212 to permanently affix the protective spacer 208 to the electrodes 202. The dielectric material 204 provides an insulating layer between the ground plane 206 and the electrodes 202. In at least some embodiments, the ground plane 206 is represented by the outer wall of the casing 52. For example, the multi-electrode configuration 200 may be fixably attached to the casing 52 with the use of adhesive, caulk, a strap, or any other attachment mechanism. Further, a cover or seal may be provided for the multi-electrode configuration 200 to prevent damage, to prevent contamination, and/or to provide a consistent inter-electrode spacing.

Figure 2A:
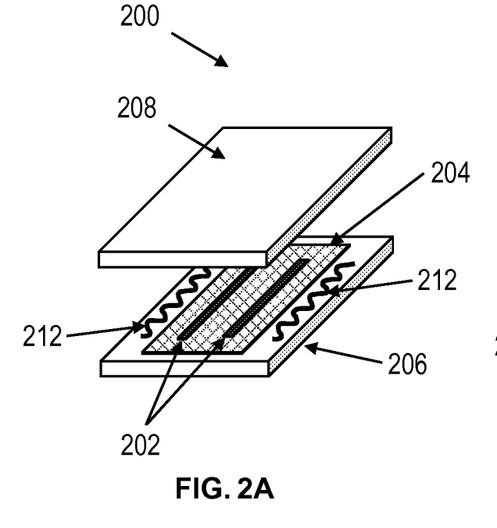
FIGS. 2A, 2B, 2C, 2D, 2E, 2F, 2G, and 2H are diagrams showing illustrative multi-electrode configurations.
Figure 2B:
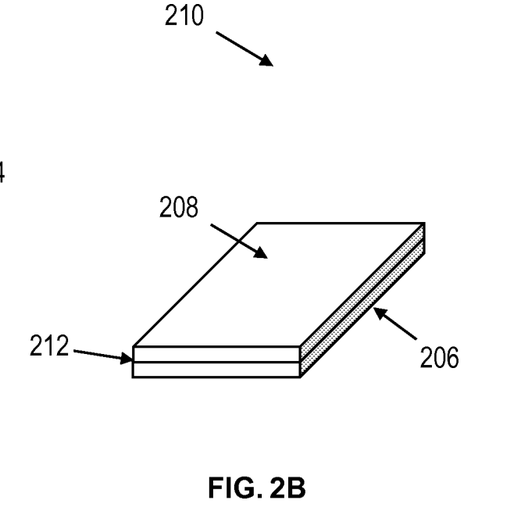
Figure 2C:
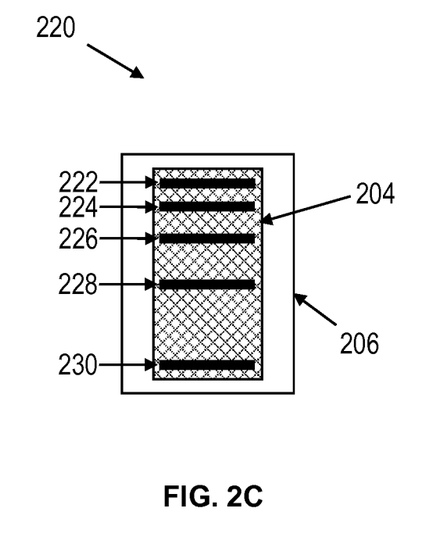
Figure 2D:
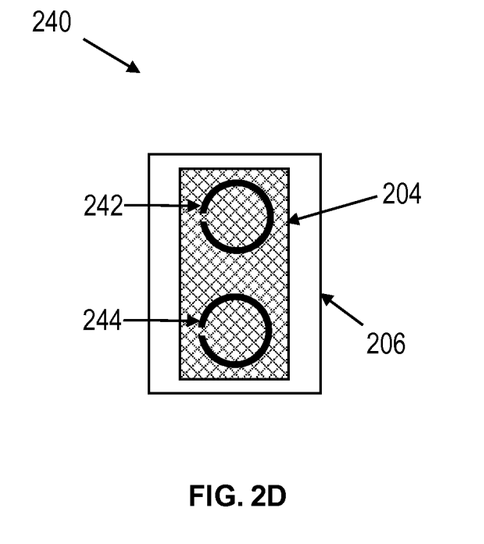
Figure 2E:
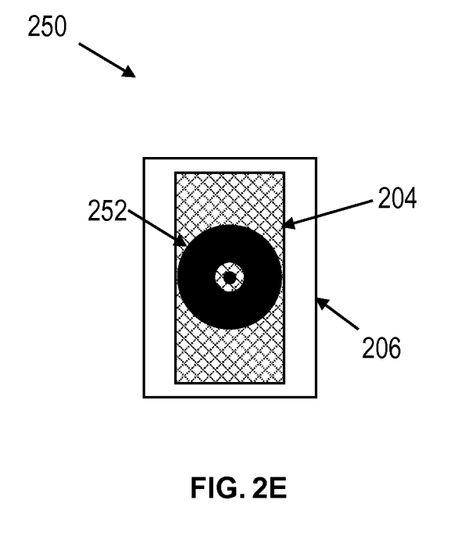
Figure 2F:
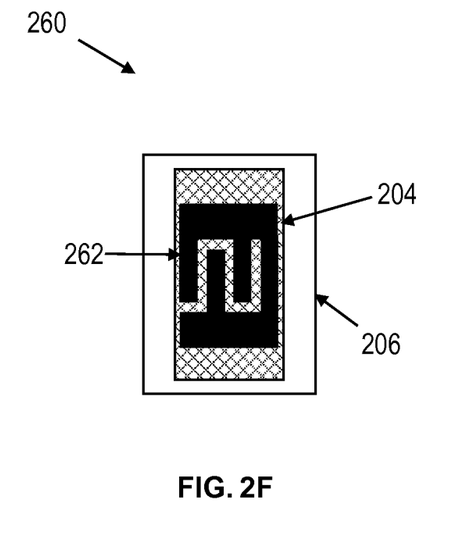
Figure 2G:
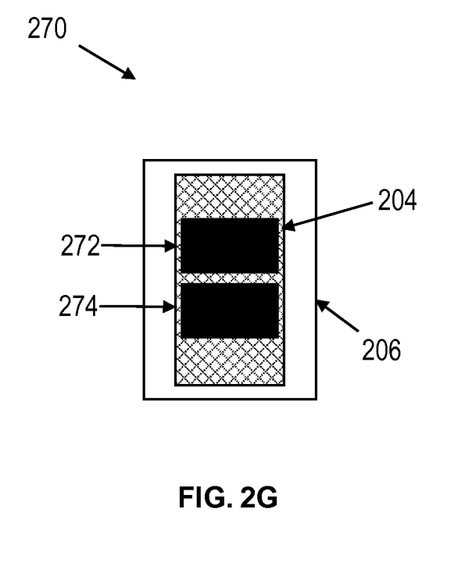
Figure 2H:
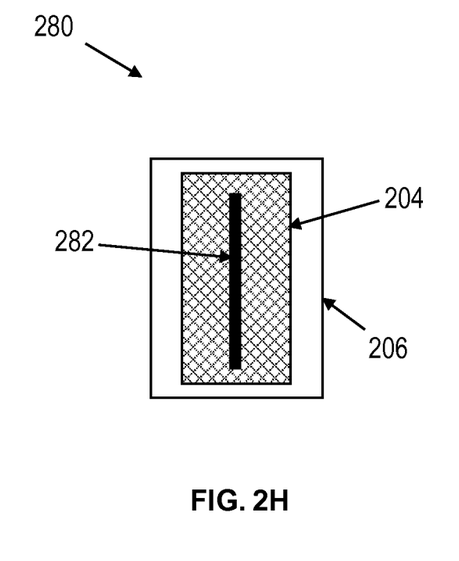

Another multi-electrode configuration 210 is shown in FIG. 2B. The multi-electrode configuration 210 has the electrodes 202 (not shown) positioned on the dielectric material (not shown) sandwiched between a ground plane and the protective spacer 208 fixably attached with adhesive 212. There are several different possible multi-electrode configuration structures, with each varying with regard to depth of investigation, resolution, or other attributes. Several additional illustrative examples of multi-electrode configurations are included herein, where protective spacer 208 and/or covers are not shown for the sake of clarity. FIG. 2C shows another version of a multi-electrode configuration 220. The multiple dipole antenna multi-electrode configuration 220 is shown with a plurality of multi-electrode pairs arranged in a linear arrangement with variable spacing. First electrode 222 is paired with several other electrodes in varying distances away, including second electrode 224, third electrode 226, fourth electrode 228, and fifth electrode 230. Additional spacing and electrodes may be added without limitation, and other embodiments are possible. In FIG. 2D, multi-electrode configuration 240 includes loop antennas, may be referred to as an inductive multi-electrode configuration. The multi-electrode configuration 240 includes a first loop electrode 242 and a second loop electrode 244. In some embodiments, the first and second loop electrodes 242, 244 are installed along an outer surface of the multi-electrode configuration 240. Alternatively, the first and second loop electrodes 242, 244 may be embedded within the structure for protection and/or to prevent direct contact with downhole fluids. In another embodiment, the first and second loop electrodes 242, 244 may be tilted or aligned with respect to the ground plane 206 for particular applications without limitation. In FIG. 2E, another multi-electrode configuration 250 includes one or more "button" electrodes 252 fixably attached to the ground plane 206. Meanwhile, FIG. 2F shows a multi-electrode configuration 260 that includes a fringing "comb" antenna or electrode 262 fixably attached to the ground plane 206. FIG. 2G shows a multi-electrode configuration 270 that includes a fringing plate antenna or electrode 272 and a second plate electrode 274 fixably attached to the ground plane 206. In FIG. 2H, multi-electrode configuration 280 includes a transmission line "microstrip" or electrode 282 fixably attached to the ground plane 206.

Without limitation, the example ground plane 206 for a multi-electrode configuration such as the configurations represented in FIGS. 2A-2H may correspond to 0.01" of Cu or less than 0.001" of Au. Further, the dielectric material 204 may correspond to less than 0.125" of a material with a dielectric constant between 2.0 to 12.0 and with a very low loss tangent (tan δ). The dielectric material 204 may also be selected based on radio frequency (RF) performance and mechanical properties. A dielectric material such as resins or room temperature vulcanizing (RTV) compounds can also be positioned between electrodes 202 and/or to cover electrodes 202 (as a cover). The dielectric material used between and/or covering electrodes 202 may be selected to have a dielectric constant ($\varepsilon_r$) value from 2.0 to 5.0, and a loss tangent (tan δ) value of around 0.05. Further, the dielectric material between and/or covering electrodes 202 may be selected based on resistance to corrosion and abrasion as well as its performance within a predetermined temperature range and pressure range. Without limitation, the electrodes 202 may be formed from Cu or Au and have the same width as the dielectric material 204.

Figure 3A:
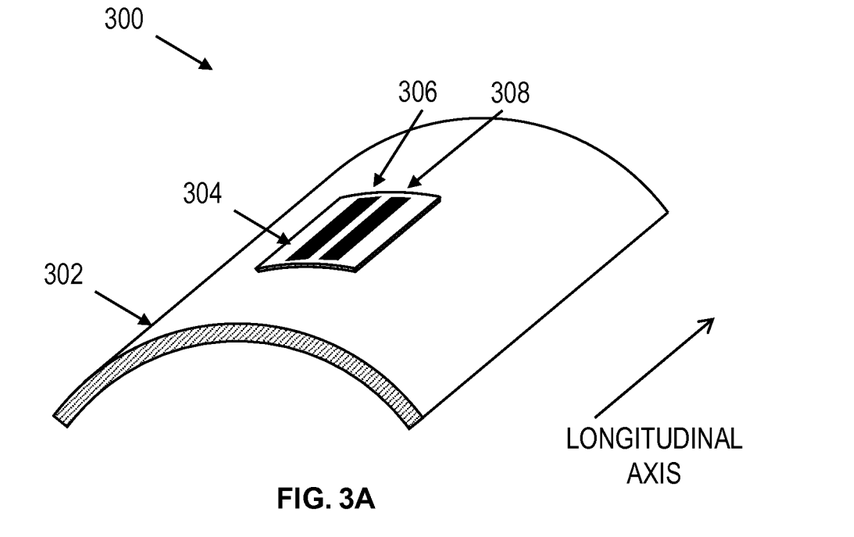
FIGS. 3A and 3B are perspective views showing different multi-electrode configurations deployed along the exterior of a casing segment.
Figure 3B:
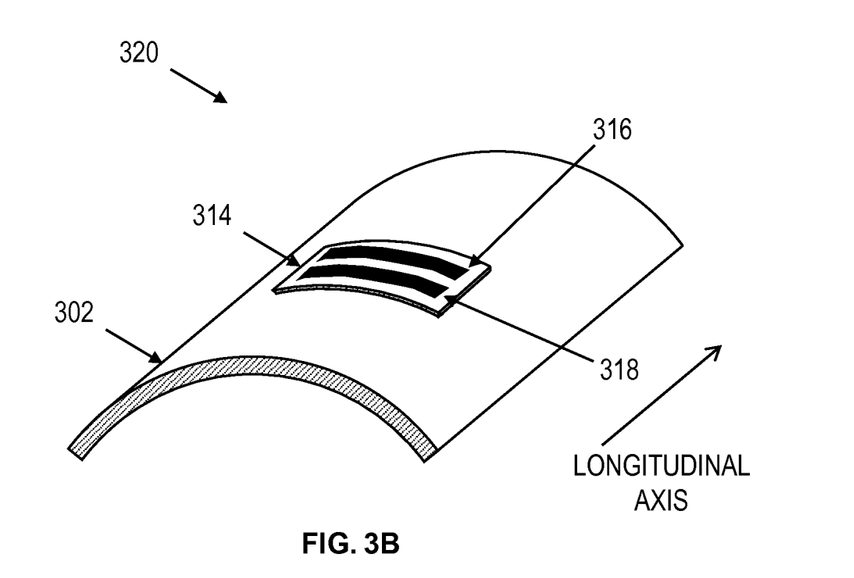

FIG. 3A shows an illustrative longitudinal multi-electrode configuration mounting arrangement 300 with a multi-electrode configuration 304 mounted on the exterior surface of a casing 302. The multi-electrode configuration 304 includes a first and second microstrip electrodes 306, 308 mounted parallel to a longitudinal axis of the casing 302. The multi-electrode configuration 304 uses an electrode arrangement similar to the one discussed in FIG. 2A, where the casing 302 corresponds to the ground plane 206 in FIG. 2A. Meanwhile, FIG. 3B shows a crosswise multi-electrode configuration mounting arrangement 320 with a multi-electrode configuration 314 mounted on the exterior surface of the casing 302. The multi-electrode configuration 314 includes first and second electrodes 316, 318 mounted perpendicular to a longitudinal axis of the casing 302 (i.e., the electrodes 316, 318 extend circumferentially around casing 302). Without limitation, the length of electrodes 306, 308 in FIG. 3A or electrodes 316, 318 in FIG. 3B may be selected to create a resonance at a desired frequency. For example, a length of around 6" for electrodes 306, 308 in FIG. 3A or electrodes 316, 318 in FIG. 3B may result in a resonance of around 100 MHz to 500 MHz (see e.g., graph 600 of FIG. 6).

Figure 4A:
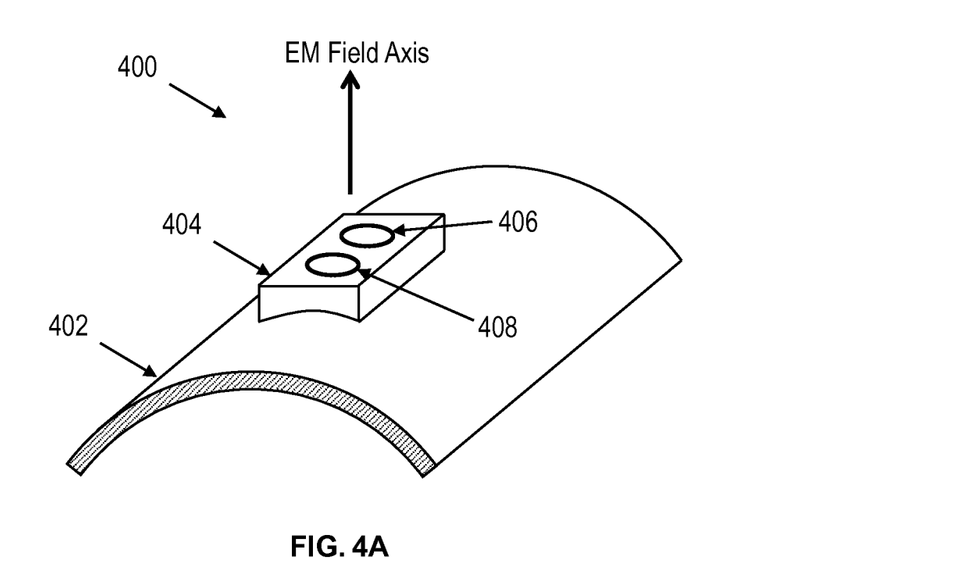
FIGS. 4A and 4B are perspective views showing alternative multi-electrode configurations deployed along the exterior of a casing segment.

FIG. 4A shows a multi-electrode configuration 404 installed on an outside surface of a casing 402 in an illustrative downhole environment 400. In FIG. 4A, the multi-electrode configuration 404 includes at least one loop antenna 406. Additional loop antennas may be present (e.g., a second loop antenna 408 is shown). The first and second loop antennas 406, 408 may be mounted along the surface of the multi-electrode configuration 404 or they may be embedded into the multi-electrode configuration body. As shown, the first and second loop antennas 406, 408 are aligned in a planar arrangement with the EM field axis perpendicular to the surface of the casing 402.

Figure 4B:
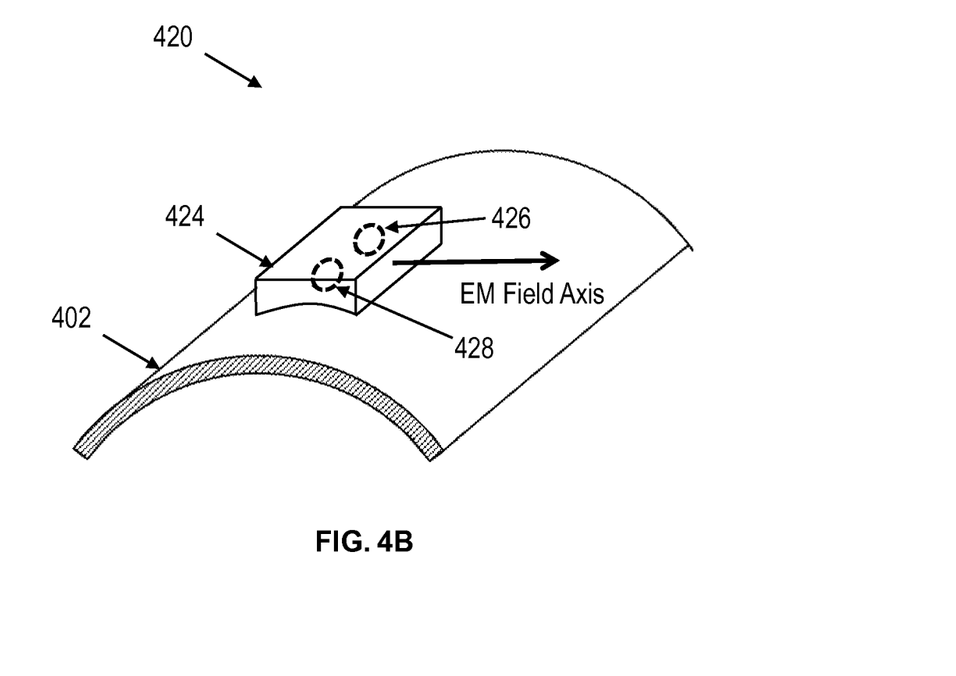

FIG. 4B shows an alternative arrangement of a multi-electrode configuration 424 installed on the exterior surface of the casing 402 in an illustrative downhole environment 420. In FIG. 4B, the multi-electrode configuration 424 includes at least one loop antenna 426. Additional loop antennas may be present (a second loop antenna 428 is shown). In this embodiment, the first and second loop antennas 426, 428 are aligned in a planar arrangement with the EM filed axis tangential to the surface of the casing 402.

Figure 5A:
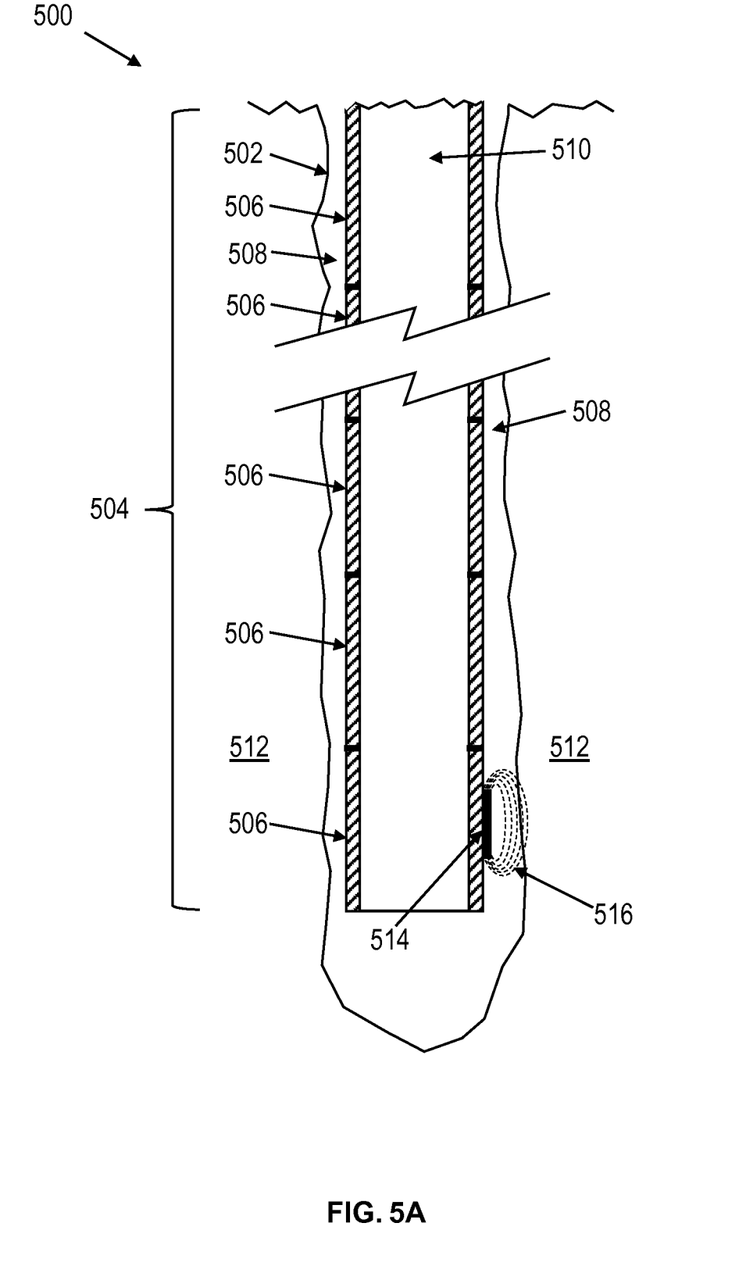
FIGS. 5A and 5B are schematic diagrams representing a multi-electrode configuration in operation in an illustrative downhole environment.

FIG. 5A shows a multi-electrode configuration deployed on the outside wall of a casing segment in an illustrative downhole environment 500. In FIG. 5A, a series of individual casing segments 506 attached together to create a casing string 504 are represented. The casing string 504 is deployed in borehole 502 and creates an annulus 508 between the casing string 504 and the wall of borehole 502. The casing string 504 has an interior 510 and multi-electrode configuration that can be used to characterize fluids in the annulus and/or formation 512.

In at least some embodiments, a 552 multi-electrode configuration 514 is connected to a power supply located at earth's surface. Alternatively, the operations of the multi-electrode configuration 514 may be powered by a downhole power supply such as a battery. Further, in at least some embodiments, the multi-electrode configuration 514 may be in communication with a control unit that provides power and/or telemetry for the multi-electrode configuration 514. In operation, the multi-electrode configuration 514 receives power from the control unit and generates an EM field 516 that penetrates the nearby annulus 508 containing fluids of interest. The EM field 516 may also penetrate a distance into the surrounding formation 512, depending on the strength and frequency associated with the EM field 516. Further, the multi-electrode configuration 514 measures corresponding EM fields that have been attenuated or other altered due to interaction with the fluid in the annulus 508 and/or with the formation 512.

Figure 5B:
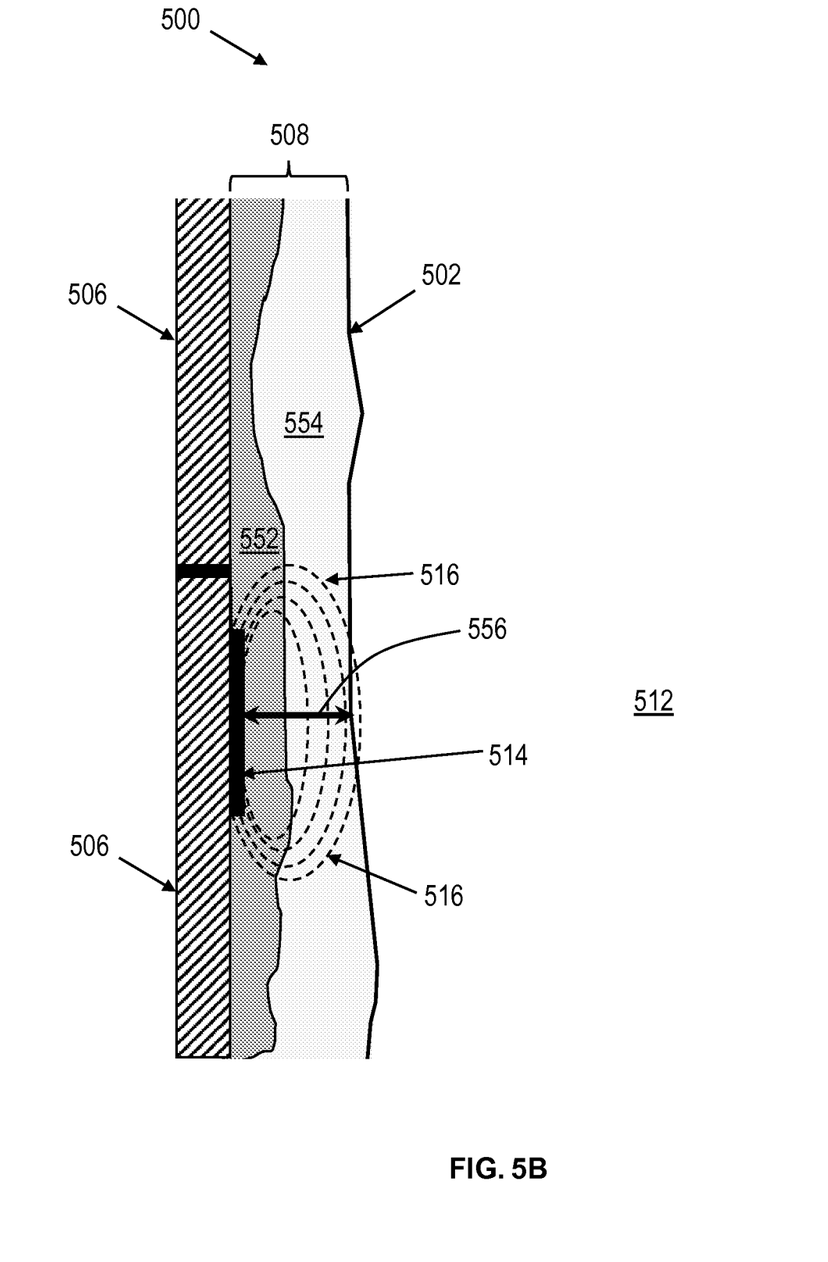

FIG. 5B shows additional details of the downhole environment 500. In FIG. 5B, a first fluid 552 and a second fluid 554 are represented within the annulus 508. The first and second fluids 552, 554 may be of any type of fluids present downhole including, but not limited to, drilling mud, spacer fluid, water, oil or gas, or a cement slurry. In some scenario, the annulus 508 contain more than two layers of fluids. By varying the depth of investigation and resolution corresponding to one or more multi-electrode configurations, it is expected that two, three, or more layers of fluids can be differentiated and identified. In addition to identifying the first fluid 552 and the second fluid 554, the multi-electrode configuration 514 may determine a distance 556 between the casing segment 506 and the borehole 502. Further, it should be appreciated that different multi-electrode configurations can be axially-spaced and/or azimuthally-spaced along one or more casing segments 506 to characterize fluids in the annulus 508 as a function of axial position (measured depth), radial position, azimuth, and/or time.

Figure 6:
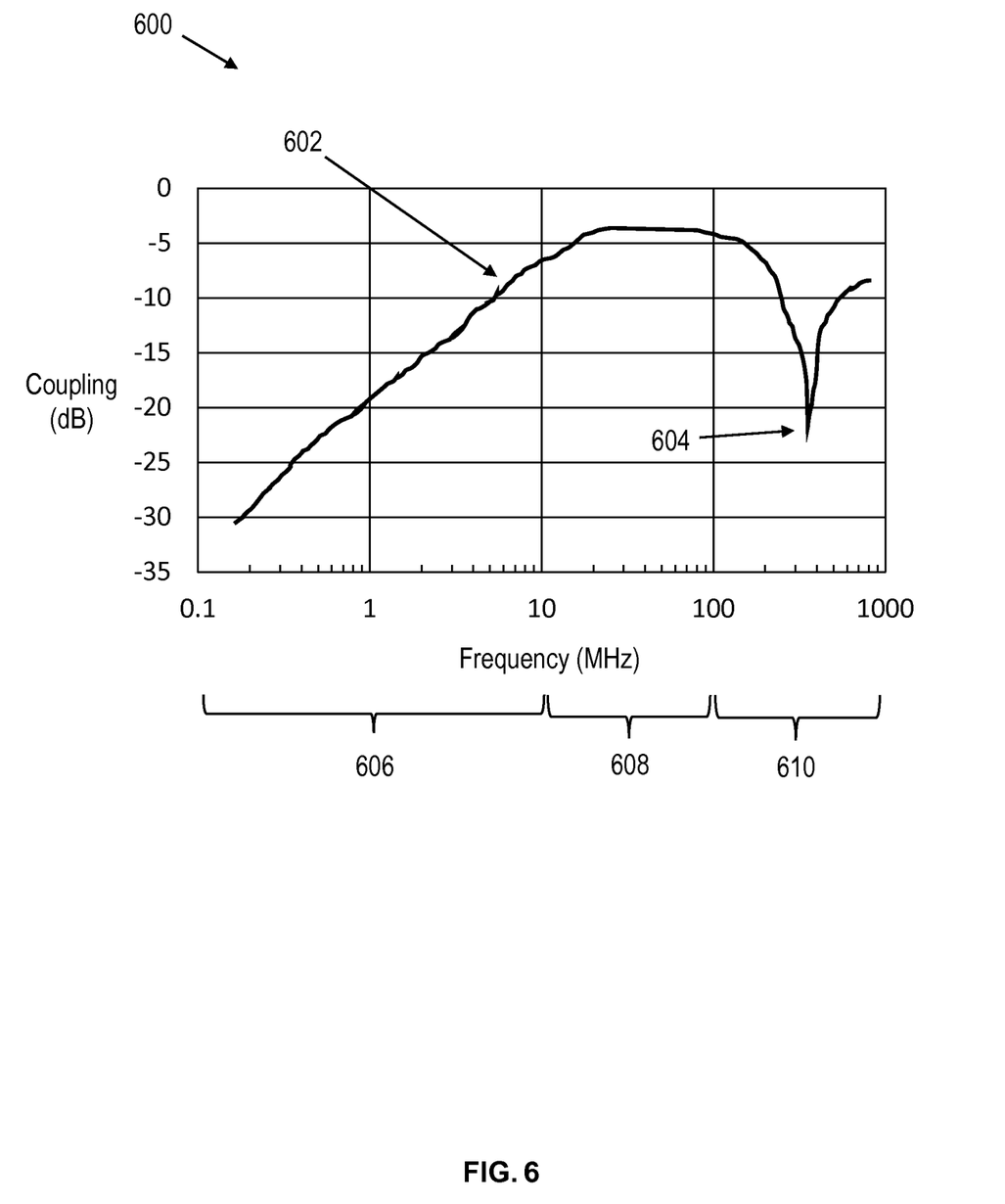
FIG. 6 is a graph showing an illustrative coupling coefficient curve as a function of frequency.

In at least some embodiments, multi-electrode configurations as described herein can be used to obtain coupling measurements between two or more electrodes, where the coupling measurements can be used to characterize fluids in the annulus 508. In FIG. 6, graph 600 shows an illustrative coupling coefficient curve 602 as a function of frequency. The coupling coefficient curve 602 corresponds to a particular sample fluid or fluids (e.g., depending on the depth of investigation and resolution intended for one or more multi-electrode configurations). More specifically, the coupling coefficient curve 602 may be associated with one or more fluids based on the maximum coupling coefficient value (around 4 dB), the sharpness of a primary resonance null 604, the depth of the primary resonance null 604, the center frequency of the primary resonance null 604, and/or other parameters.

As a general rule, fluids with higher resistivity have sharper and deeper primary resonance nulls 604. Also, fluids with higher dielectric constants have higher coupling coefficient maximums. When plotting coupling coefficient data as a function of logarithmic frequency values, the lower frequency region becomes nearly a straight line and a coupling model may be used to fit the measured data using three parameters: C, n' (real component), and n" (imaginary component). These fit values then form one type of "signature" for any fluid combination:

$$\text{coupling (dB)} = 10\log10\left(\frac{(jC\tan\theta)}{\sqrt{1-C^2}+j\tan\theta}\right), \quad \text{(Equation 1)}$$

where $\theta = \frac{2\pi f}{c} n^f$ and $n = n' - jn''$.

Using the fit parameters, homogeneous fluids are readily differentiated. Test results indicate that the values of n' and n" will vary for different fluids or fluid mixtures. With layered fluids (such as thicker drilling mud adhering to the casing exterior surface with less viscous spacer fluid filling the remainder of the annulus), most parameters match the fluid nearest the electrodes but are nonetheless different. In the case of borehole servicing fluids, the fluids have effective $\varepsilon_r$ values that vary with frequency over the range 10 MHz to 1000 MHz and also have varying tan δ values. The variations in both $\varepsilon_r$ and tan δ can be used to differentiate fluid mixtures. In at least some embodiments, a set of template coupling coefficient curves previously derived or measured for known fluids or mixtures of fluids are compared to a coupling coefficient curve obtained from the measurements of one or more multi-electrode configurations deployed downhole. The template coupling coefficient curve that best matches the measured coupling coefficient curve can be selected and used to characterize a fluid or fluids in the annulus near the multi-electrode configuration(s) corresponding to the obtained measurements. One or ordinary skill in the art would appreciate that besides comparing coupling coefficient curves, other analysis techniques may be employed to characterize fluids in an annulus using measurements from one or more multi-electrode configurations deployed along a casing exterior as described herein. For example, alternative analysis methods would include use of multi-layer artificial neural networks (ANN), forward modeling combined with the use of least squares analysis of fit quality, and geophysical inversion methods.

Further, in different embodiments, data processing variations may be helpful to conserve memory and/or to focus measurement analysis to particular areas of interest. For example, in order to conserve data memory, the coupling coefficient may be measured only at spaced intervals along a linear frequency axis or a log frequency axis as shown in FIG. 6. Further, the sampling interval may vary for different frequency regions (e.g., the sampling interval for region 608 may be smaller than the sampling interval for regions 606 and 610 to provide higher resolution for resonance null analysis). Also, the operator may vary the frequency sweep intervals when collecting measurements. Further, in at least some embodiments, fluids to be pumped downhole may be altered or "spiked" by adding small quantities of other materials to the fluids to enhance variations in their dielectric constants, magnetic permeabilities, and/or conductivities. Such alterations may be useful when two base fluids are found to be relatively similar such that measurements obtained from multi-electrode configurations are unable to distinguish between the two base fluids.

The volume of fluid corresponding to measurement obtained from multi-electrode configurations, is directly related to the spacing between the electrodes. Electrodes that are close together will provide information regarding fluid that is close to the casing, while electrodes that are spaced far apart will provide information regarding fluid that is further from the casing (possible even near the borehole wall and/or the surrounding formation). With multiple sets of electrodes with different spacings, one can analyze what fluids are near the casing, within the annulus, near the borehole wall, and/or in the formation. Further, the position of the borehole wall relative to the casing can be determined. As desired, fluid characterization operations using multi-electrode configurations as described herein can be used before, during, and/or after cementing operations to improve the efficiency and/or quality of cementing operations. As drilling operations are dependent on cement curing time, detecting cementing curing using the measurements from multi-electrode configurations as described herein can also reduce the overall time needed to drill a borehole.

Figure 7:
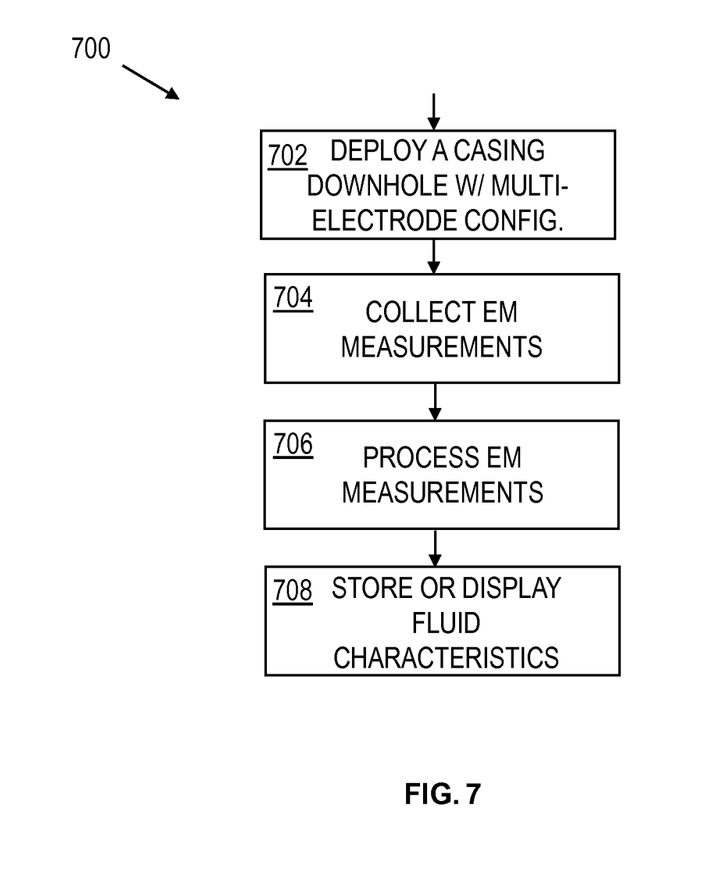
FIG. 7 is a flowchart showing an illustrative downhole fluid characterization method using a casing with a multi-electrode configuration.

FIG. 7 shows a flowchart showing an illustrative downhole fluid characterization method 700. As shown, the method 700 includes deploying a casing with a multi-electrode configuration in a downhole environment 702 (e.g., FIGS. 5A and 5B). In the downhole environment, the multi-electrode configuration will be in close proximity with the fluids present in the annulus and/or in the surrounding formation. Accordingly, the multi-electrode configuration can be used to detect characteristics of nearby fluids as described herein. At block 704, EM measurements are collected using the multi-electrode configuration, where the collected EM measurements are a function of the conductivity, magnetic permeability, dielectric constant, and/or other properties of nearby fluids. At block 706, the collected EM measurements are processed. For example, the processing operations of block 706 may include performing a coupling coefficient analysis and/or curve comparison as described herein. At block 708, fluid characteristics identified based on the processing operations of block 706 are stored or displayed. For example, the identified fluid characteristics may be represented in text form, graph form, log form (e.g., one or more fluid layers and respective thicknesses as a function of measured depth, azimuth, time, etc), and/or as an image of the borehole environment near the multi-electrode configuration. In at least some embodiments, a multi-layer model is used, and the properties of each layer (e.g., thickness, fluid type(s), dielectric constant, magnetic permeability, conductivity, etc.) are represented to an operator. Using the stored or displayed fluid characterization information, the operator may make decisions such as initiating or stopping pumping operations for one or more fluids related to drilling or cementing operations, altering fluids being pumped (e.g., providing an additive to enhance EM properties of different fluids being pumped), initiating or stopping drilling operations, etc.

Embodiments disclosed herein include:

A: A method that comprises deploying a casing with a multi-electrode configuration over a dielectric layer in a downhole environment, collecting EM measurements using the multi-electrode configuration, and processing the EM measurements to obtain a characterization of fluids in an annulus between the casing and the borehole wall.

B: A system that comprises a casing deployed downhole, the casing having a multi-electrode configuration and a dielectric layer between the casing and the multi-electrode configuration. The system also comprises a controller for directing collection of EM measurements using the multi-electrode configuration. The system also comprises a processor that processes the EM measurements to obtain a characterization of fluids in an annulus between the casing and a borehole wall.

Each of embodiments A and B may have one or more of the following additional elements in any combination: Element 1: wherein collecting EM measurements is performed using multiple electrode pairs, each of the pairs having a different inter-electrode spacing. Element 2: wherein collecting EM measurements is performed using multiple electrode pairs, each of the pairs having a different resonant frequency. Element 3: wherein processing the EM measurements involves inverting the EM measurements to obtain parameters of a multi-layer model. Element 4: wherein parameters comprise at least one of a dielectric constant and a conductivity for each layer of the multi-layer model. Element 5: further comprising processing the EM measurements to identify a boundary of the multi-layer model that represents the borehole wall. Element 6: further comprising displaying a representation of layer thickness for at least one fluid in the annulus as a function of time based on the characterization. Element 7: wherein collecting EM measurements comprises collecting EM measurements corresponding to a plurality of different frequencies. Element 8: further comprising adjusting a cementing operation based on the characterization. Element 9: further comprising providing power and telemetry for the multi-electrode configuration via wired pipes or via a wire deployed in the annulus. Element 10: wherein the multi-electrode configuration comprises multiple electrode pairs, each of the pairs having a different inter-electrode spacing. Element 11: wherein the multi-electrode configuration comprises multiple electrode pairs, each of the pairs having a different orientation. Element 12: wherein the multi-electrode configuration comprises multiple electrode pairs, each of the pairs having a different resonant frequency. Element 13: wherein the controller causes collection of EM measurements corresponding to a plurality of different frequencies. Element 14: wherein the processor inverts the EM measurements to obtain parameters of a multi-layer model, wherein the parameters include a thickness for each layer of the multi-layer model. Element 15: wherein the processor inverts the EM measurements to obtain parameters of a multi-layer model, wherein the parameters include at least one of a dielectric constant, a conductivity, or a permeability for each layer of the multi-layer model. Element 16: wherein the processor inverts the EM measurements to obtain parameters of a multi-layer model, wherein the parameters include a boundary that represents the borehole wall. Element 17: further comprising a monitor in communication with the processor, wherein the processor causes the monitor to display a representation of layer thickness for at least one fluid in the annulus as a function of time based on the characterization. Element 18: wherein the multi-electrode configuration receives power and telemetry using wired pipes or a wire deployed in the annulus.

What is claimed is:

1. A method comprising:
   deploying a casing with a multi-electrode configuration in a downhole environment, the multi-electrode configuration comprising:
     electrodes attached to a dielectric material, each electrode comprising a loop antenna disposed on an outer surface of the casing, wherein each loop antenna is substantially circular and includes a gap, wherein the gaps of the loop antennas are oriented in the same direction;
     a ground plane; and
     an electrically-isolating protective spacer;
     wherein the electrodes and the dielectric material are positioned between the ground plane and the electrically-isolating protective spacer;
   collecting electromagnetic (EM) measurements using the multi-electrode configuration; and
   processing the EM measurements to obtain a characterization of fluids in an annulus between the casing and a borehole wall.

2. The method of claim 1, wherein said collecting EM measurements is performed using multiple electrode pairs, each of the pairs having a different inter-electrode spacing.

3. The method of claim 1, further comprising processing the EM measurements to obtain a distance from the multi-electrode configuration to the borehole wall.

4. The method of claim 1, wherein said processing the EM measurements involves inverting the EM measurements to obtain parameters of a multi-layer model.

5. The method of claim 4, wherein said parameters comprise at least one of a dielectric constant and a conductivity for each layer of the multi-layer model.

6. The method of claim 4, further comprising processing the EM measurements to identify a boundary of the multi-layer model that represents the borehole wall.

7. The method of claim 1, further comprising displaying a representation of layer thickness for at least one fluid in the annulus as a function of time based on said characterization.

8. The method of claim 1, wherein said collecting EM measurements comprises collecting EM measurements corresponding to a plurality of different frequencies.

9. The method of claim 1, further comprising adjusting a cementing operation based on the characterization.

10. The method of claim 1, further comprising providing power and telemetry for the multi-electrode configuration via wired pipes or via a wire deployed in the annulus.

11. The method of claim 1, further comprising identifying three or more layers of fluids.

12. The method of claim 1, wherein the electrodes comprise gold or copper, wherein the electrodes have the same width as the dielectric material.

* * * * *